(12) United States Patent
Lall et al.

(10) Patent No.: US 7,632,011 B1
(45) Date of Patent: Dec. 15, 2009

(54) INTEGRATED CIRCUIT TEMPERATURE SENSOR SYSTEMS AND METHODS

(75) Inventors: Ravindar M. Lall, Portland, OR (US); Nathan Green, Beaverton, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 225 days.

(21) Appl. No.: 11/750,616

(22) Filed: May 18, 2007

(51) Int. Cl.
*G01K 3/00* (2006.01)

(52) U.S. Cl. .................................. 374/103; 323/315
(58) Field of Classification Search ................ 374/103, 374/163, 170, 178; 307/310; 323/315
See application file for complete search history.

(56) References Cited

U.S. PATENT DOCUMENTS

| | | | |
|---|---|---|---|
| 4,395,139 A * | 7/1983 | Namiki et al. ............... | 374/178 |
| 5,039,978 A * | 8/1991 | Kronberg ............... | 340/815.45 |
| 5,085,526 A | 2/1992 | Sawtell et al. | |
| 5,519,354 A | 5/1996 | Audy | |
| 5,619,430 A | 4/1997 | Nolan et al. | |
| 5,961,215 A * | 10/1999 | Lee et al. .................... | 374/178 |
| 6,412,977 B1 * | 7/2002 | Black et al. ................. | 374/178 |
| 6,749,335 B2 | 6/2004 | Gauthier et al. | |
| 7,033,072 B2 * | 4/2006 | Aota et al. .................. | 374/178 |
| 7,034,507 B2 | 4/2006 | Lovett | |
| 7,135,913 B2 | 11/2006 | Min et al. | |
| 7,197,420 B2 | 3/2007 | Johns et al. | |
| 7,225,099 B1 | 5/2007 | O'Dwyer | |
| 7,410,293 B1 | 8/2008 | Santurkar et al. | |
| 7,524,107 B1 | 4/2009 | Lorenz | |
| 2003/0214998 A1 | 11/2003 | Gauthier et al. | |
| 2005/0093617 A1 | 5/2005 | Min et al. | |
| 2005/0135163 A1 * | 6/2005 | Schneider et al. ...... | 365/189.09 |
| 2005/0270011 A1 * | 12/2005 | Aota et al. .................. | 323/315 |
| 2006/0111865 A1 | 5/2006 | Choi | |
| 2007/0258503 A1 | 11/2007 | Clark et al. | |
| 2008/0151966 A1 | 6/2008 | Clark et al. | |
| 2009/0110023 A1 | 4/2009 | Clark et al. | |

OTHER PUBLICATIONS

Lall, U.S. Appl. No. 12/099,933, filed Apr. 9, 2008.

* cited by examiner

*Primary Examiner*—Andre J Allen
(74) *Attorney, Agent, or Firm*—Haynes and Boone, LLP

(57) ABSTRACT

Systems and methods disclosed herein provide temperature monitoring within an integrated circuit. For example, in accordance with an embodiment of the present invention, a bandgap reference circuit provides a reference voltage; a constant current generator provides a constant current; and a reference signal circuit receives the reference voltage and provides a reference signal having a selectable value based on the reference voltage. A bipolar diode receives the constant current and provides a sense signal, with a value of the sense signal corresponding approximately to a temperature value of the integrated circuit. A comparator receives the sense signal and the reference signal and provides a temperature sensor output signal.

20 Claims, 2 Drawing Sheets

INTEGRATED CIRCUIT TEMPERATURE SENSOR SYSTEMS AND METHODS

TECHNICAL FIELD

The present invention relates generally to electrical circuits and, more particularly, to integrated circuit temperature sensor systems and methods, such as for programmable logic devices.

BACKGROUND

Power dissipation, especially for large integrated circuits, tends to generate a significant amount of heat, which may raise the junction temperature of the integrated circuit above safe reliability limits (e.g., above process limits). Consequently, it is important to monitor and maintain the temperature of the integrated circuit to within safe operating limits to prevent failure or a noticeable reduction in device lifetime.

A conventional integrated circuit junction temperature monitoring approach uses an on-chip temperature sensing diode connected between two input/output pins of the integrated circuit for monitoring by a separate integrated circuit. Thus, this approach requires a separate integrated circuit on the printed circuit board to receive and translate the diode voltage and/or current (e.g., using a delta-sigma analog-to-digital converter) into a corresponding temperature value, which may be complex and costly in terms of printed circuit board space, interface limitations, assembly costs, and/or power requirements.

As a result, there is a need for improved techniques for measuring the temperature of an integrated circuit.

SUMMARY

In accordance with one embodiment of the present invention, an integrated circuit includes a bandgap reference circuit adapted to provide a reference voltage; a constant current generator adapted to provide a constant current; a reference signal circuit adapted to receive the reference voltage and provide a reference signal having a selectable value based on the reference voltage; a bipolar diode adapted to receive the constant current and provide a sense signal, wherein a value of the sense signal corresponds approximately to a temperature value of the integrated circuit; and a comparator adapted to receive the sense signal and the reference signal and provide a temperature sensor output signal.

In accordance with another embodiment of the present invention, an integrated circuit includes means for providing a reference current; means for providing a reference voltage; means for providing a reference signal having a selectable value based on the reference voltage; means for providing a sense signal based on the reference current and a junction temperature of the integrated circuit; and means for providing a temperature sensor output signal based on a comparison of the reference signal to the sense signal.

In accordance with another embodiment of the present invention, a method of monitoring a temperature of an integrated circuit includes generating a reference current within the integrated circuit; generating a reference voltage within the integrated circuit; selecting within the integrated circuit a reference signal having a voltage level based on the reference voltage; providing a sense signal based on the reference current and the temperature of the integrated circuit; and comparing within the integrated circuit the reference signal to the sense signal to provide a temperature sensor output signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with one or more embodiments of the present invention, temperature sensor systems and methods are disclosed for integrated circuits, which specifically may be implemented within the integrated circuit to monitor integrated circuit temperature (e.g., on die temperature sensor techniques). For example, the temperature sensor systems and methods may provide a temperature measurement or a temperature warning indication from within the integrated circuit based on the internal temperature monitoring of the integrated circuit.

It should be understood that embodiments of the present invention may be implemented within any type of integrated circuit as would be understood by one skilled in the art. As an implementation example for an embodiment, a programmable logic device (PLD) is illustrated as an example of an integrated circuit that may include a temperature sensor system as discussed herein, but this is not limiting as any type of integrated circuit may use the techniques disclosed herein for monitoring integrated circuit temperature.

Figure 1:
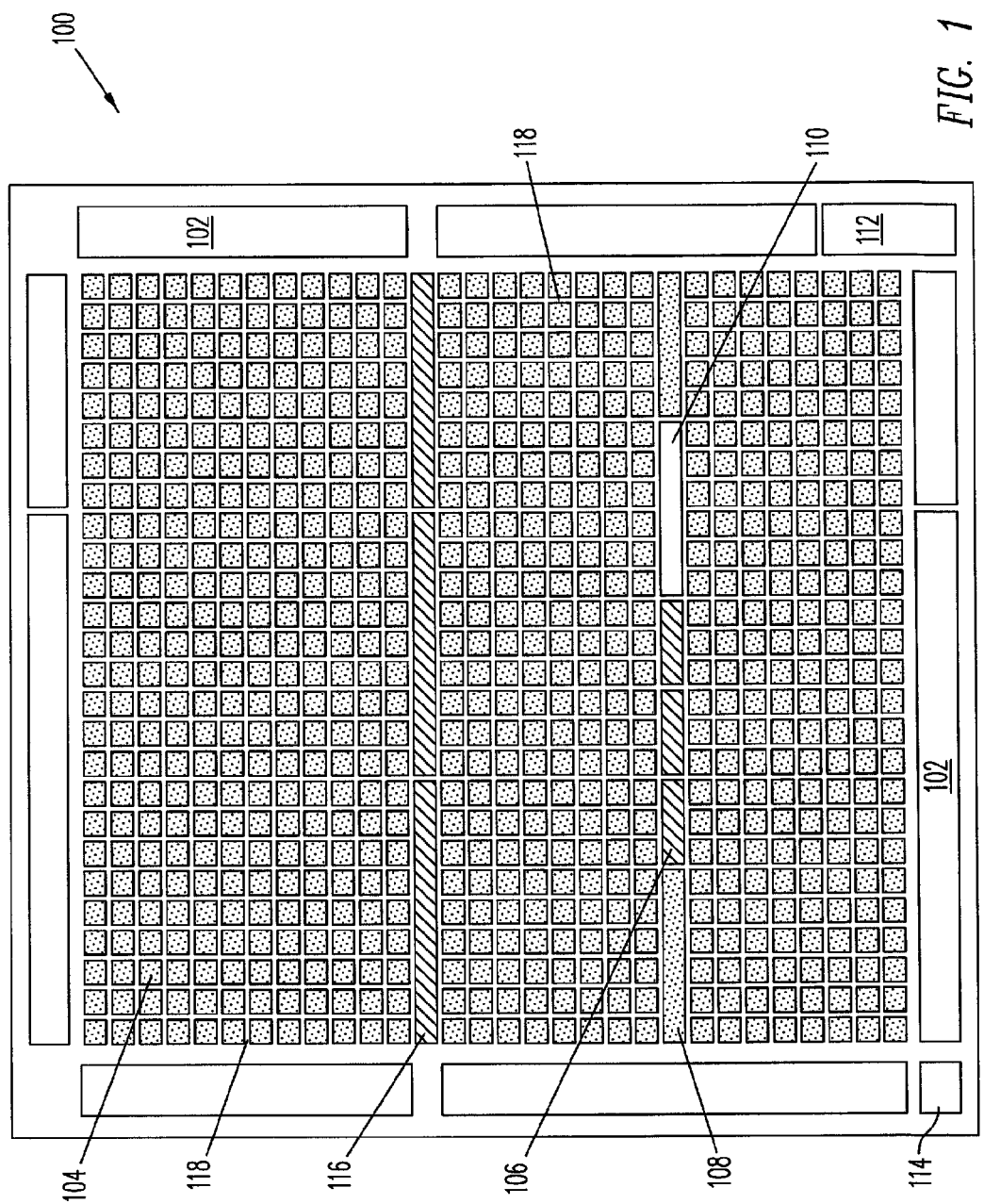
FIG. 1 shows a block diagram illustrating a programmable logic device in accordance with an embodiment of the present invention.

As an example, FIG. 1 shows a block diagram illustrating a programmable logic device (PLD) 100 in accordance with an embodiment of the present invention. PLD 100 (e.g., an FPGA, a CPLD, or a field programmable system on a chip (FPSC)) may include input/output (I/O) blocks 102 and logic blocks 104 (e.g., also referred to as programmable logic blocks (PLBs), programmable functional units (PFUs), or programmable logic cells (PLCs)). I/O blocks 102 provide I/O functionality (e.g., supports one or more I/O and/or memory interface standards) for PLD 100, while programmable logic blocks 104 provide logic functionality (e.g., LUT-based logic) for PLD 100.

PLD 100 may also include blocks of memory 106 (e.g., blocks of EEPROM, block SRAM, and/or flash memory), clock-related circuitry 108 (e.g., PLL and/or DLL circuits), configuration logic 110 (e.g., for startup, encryption, and/or error detection), a configuration port 112, configuration memory 114, special function blocks 116 (e.g., DSP blocks or other forms of multiply and accumulate circuit functionality), and/or routing resources 118 (e.g., a conventional general interconnect routing fabric throughout PLD 100).

Configuration port 112 may be optionally implemented and used for programming memory 106 and/or configuration memory 114 of PLD 100 as would be understood by one skilled in the art. For example, configuration port 112 may include a programming port, such as a central processing unit (CPU) port (also referred to as a peripheral data port or a sysCONFIG programming port) and/or a programming port such as a joint test action group (JTAG) port (e.g., by employing standards such as Institute of Electrical and Electronics Engineers (IEEE) 1149.1 or 1532 standards). Configuration port 112 typically may be included to receive configuration data and commands.

It should be understood that the number and placement of the various elements, such as I/O blocks 102, logic blocks 104, memory 106, clock-related circuitry 108, configuration logic 110, configuration port 112, configuration memory 114, special function blocks 116, and routing resources 118, is not limiting and may depend upon the desired application. For example, special function blocks 116 are optional as are various other elements (e.g., memory 106) and may not be required for a desired application. Furthermore, it should be understood that the elements are illustrated in block form for clarity and that certain elements, such as configuration memory 114 for example, would typically be distributed throughout PLD 100, such as in and between logic blocks 104, to perform their conventional functions (e.g., storing configuration data that configures PLD 100).

Figure 2:
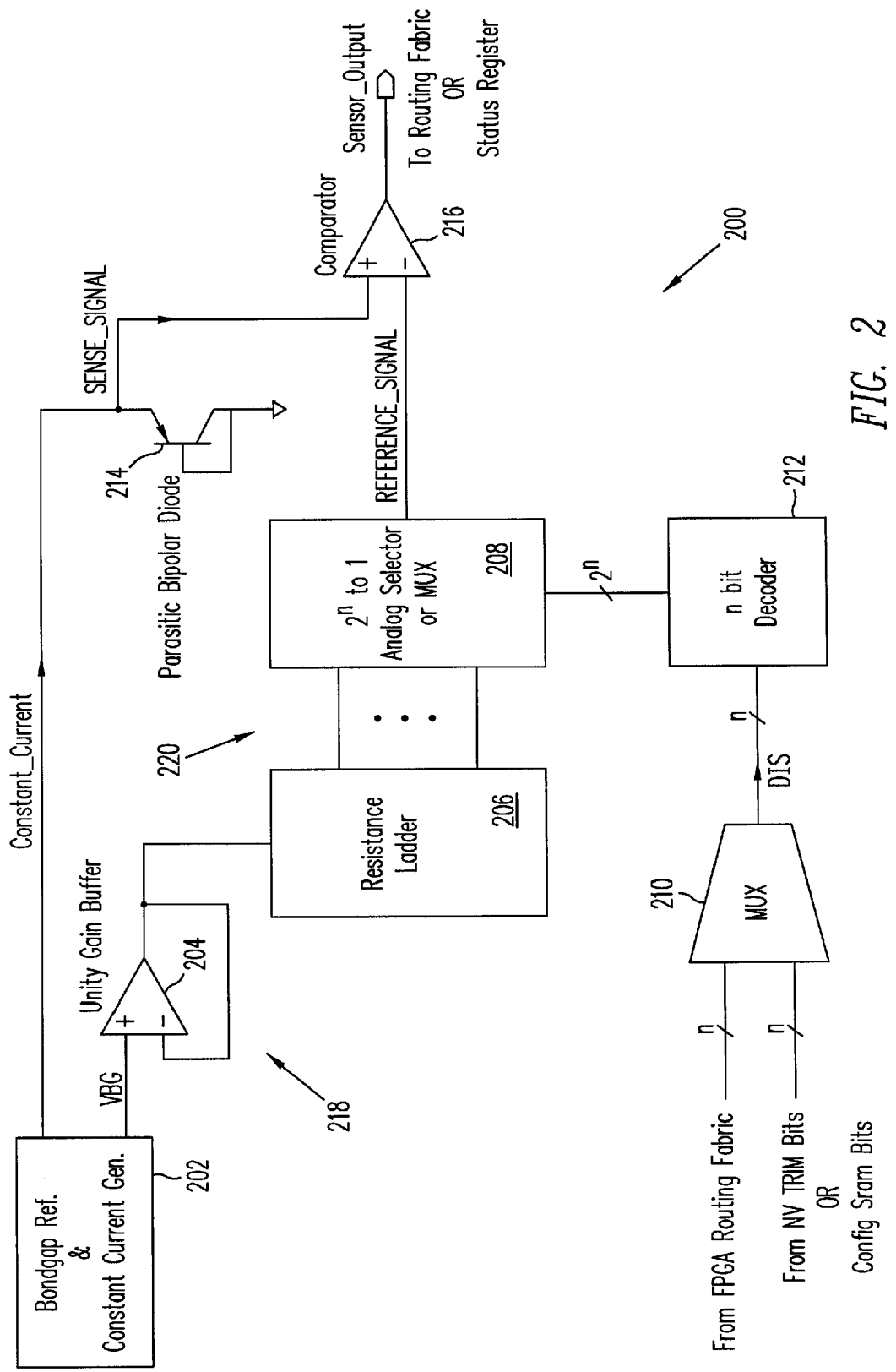
FIG. 2 shows a circuit block diagram illustrating an example of a temperature sensor for the programmable logic device of FIG. 1 in accordance with an embodiment of the present invention.

In accordance with one or more embodiments of the present invention, temperature sensor systems and methods may be implemented, for example, within PLD 100. As an example, FIG. 2 shows a circuit 200 illustrating an example of a temperature sensor technique that may be implemented within an integrated circuit, such as within PLD 100 (FIG. 1) in accordance with an embodiment of the present invention, to monitor a junction temperature (device temperature) of PLD 100. Circuit 200 (e.g., representing an on die temperature sensor) includes a voltage/current source circuit 218, a selectable reference signal circuit 220, a bipolar diode 214 (e.g., a bipolar junction transistor configured as a parasitic bipolar diode), and a comparator 216.

In general, selectable reference signal circuit 220 and bipolar diode 214 receive a reference voltage (labeled VBG) and a reference current (labeled Constant_Current), respectively, from voltage/current source circuit 218. Bipolar diode 214 provides a sense signal to comparator 216, which compares the sense signal to a reference signal from selectable reference signal circuit 220 to provide a temperature sensor output signal (e.g., a digital output labeled Sensor_Output).

The sense signal is temperature dependent due to bipolar diode 214 having an emitter-base voltage (Veb) that changes with temperature (e.g., approximately 2 mV/° C.). Thus, because the emitter-base voltage (Veb) changes with temperature, every value of the emitter-base voltage (Veb) may have a particular corresponding temperature value (junction temperature value) of the integrated circuit. For example, as the junction temperature of PLD 100 increases, a voltage level of the sense signal will decrease in a corresponding fashion due to the corresponding decrease in the emitter-base voltage (Veb) of bipolar diode 214. Consequently, by proper selection of a value for the reference signal, comparator 216 may be used to monitor the sense signal and indicate via the temperature sensor output signal when a desired temperature has been exceeded by comparing the sense signal to the reference signal.

The temperature sensor output signal (Sensor_Output) may be provided to the PLD's routing fabric (e.g., routing resources 118 of FIG. 1), which may be used to control certain functions based on the signal value (e.g., logical low value indicating a high temperature indication). For example, clock signals may be modified (e.g., gate clocks or reduce clock frequency) or a power down mode may be initiated for the PLD. Alternatively, the temperature sensor output signal (Sensor_Output) may be provided external to the PLD (e.g., via a status register, output pin, and/or JTAG interface) to indicate to an external device whether a high temperature condition exists. For example, the external device may remove power from the PLD (e.g., switch off the PLD) or take other measures to address the high temperature condition.

Voltage/current source circuit 218 may be implemented, for example, with a circuit 202 and an optional buffer 204 (e.g., a unity gain buffer). Circuit 202 may include or represent, for example, a bandgap reference circuit to provide the reference voltage (VBG, a process, voltage, and temperature compensated bandgap voltage) and a constant current generator to provide the reference current (Constant_Current). For example, the reference current (Constant_Current) may represent a process, current, and temperature compensated constant, trimmed current of approximately 10 uA.

Selectable reference signal circuit 220 may be implemented, for example, with a resistance ladder 206, a multiplexer 208, and a decoder 212 (e.g., an n-bit decoder). Resistance ladder 206 (e.g., a resistor stack) receives the reference voltage (VBG) generated by circuit 202 and through multiple tap points provides a plurality of voltage levels based on the reference voltage (VBG), which are selectable by multiplexer 208 to provide a desired value of the reference signal for comparator 216. Alternatively, selectable reference signal circuit 220 may be implemented, for example, with resistance ladder 206 that provides the plurality of voltage levels to a corresponding plurality of comparators 216, with each comparing the sense signal to the corresponding voltage level from resistance ladder 206. For this implementation as an example, the temperature sensor output signal (Sensor_Output) would consist of a multi-bit output signal, with the number of bits corresponding to the number of comparators 216.

Decoder 212 may be implemented, for example, to control the selection by multiplexer 208 (e.g., by providing a $2^n$ control signal as shown) of one of the voltage levels to provide as the value of the reference signal to comparator 216. Alternatively, a control signal may be provided directly (e.g., without implementing decoder 212) to multiplexer 208 to control the selection by multiplexer 208.

A decoder input signal (labeled DIS, e.g., an n-bit control signal as shown) for decoder 212 may be provided, for example, by a multiplexer 210, which may choose from various selectable input signals to provide as the decoder input signal (DIS). As an example, one of the selectable input signals may be provided by the PLD's (e.g., FPGA) routing fabric, which may allow dynamic control to select the desired voltage level that corresponds to a desired temperature setting to provide for the reference signal to comparator 216. By providing dynamic control, this allows ease of characterization for the temperature setting selection and process, with the selectable input signal set for example as fixed code in the logic fabric (e.g., performed by logic blocks 104 of FIG. 1) or provided via an input pin through the routing fabric (e.g., via routing resources 118 of FIG. 1) to multiplexer 210 (or directly to multiplexer 208).

Other possible selectable input signals to multiplexer 210 may, for example, be provided by memory, non-volatile or volatile, within the PLD (e.g., memory 106 or configuration memory 114 of FIG. 1). For example for non-volatile memory, one block of memory 106 may be implemented as flash memory, with some of the memory cells used as non-volatile (NV) trim bits, which may be set by the manufacturer or user of the PLD to provide one or more of the selectable input signals. As example for volatile memory, configuration memory 114 (configuration SRAM bits) may be used or one block of memory 106 may be implemented as block RAM within the PLD to provide one or more of the selectable input signals.

Systems and methods are disclosed herein to provide temperature monitoring for integrated circuits. For example, in accordance with an embodiment of the present invention, a temperature sensor circuit (e.g., an on die temperature sensor) is disclosed that may be implemented within any type of integrated circuit (e.g., a PLD). As an example, a number of the temperature sensor circuits may be implemented within the integrated circuit to monitor various regions and indicate if a maximum integrated circuit temperature (e.g., junction temperature) is exceeded. For example, circuit 200 may be replicated within the integrated circuit or circuit 200 may support multiple bipolar diodes 214 within the integrated circuit as would be understood by one skilled in the art.

In contrast to some conventional approaches, the systems and methods disclosed herein may be implemented completely within the integrated circuit (e.g., with minimal circuitry). Furthermore, the temperature sensor systems and methods, for example, may be characterized to account for certain variables (e.g., bandgap voltage variation, constant current variations, and/or comparator offsets) and to provide for the proper selection of the reference signal.

Embodiments described above illustrate but do not limit the invention. It should also be understood that numerous modifications and variations are possible in accordance with the principles of the present invention. For example, the source circuit may be implemented as one or more circuits performing the described functions. Accordingly, the scope of the invention is defined only by the following claims.

What is claimed is:

1. A programmable logic device comprising:
   a plurality of logic blocks;
   a plurality of input/output blocks adapted to provide an input/output interface for the programmable logic device;
   at least one memory block for storing data during operation of the programmable logic device;
   an interconnect structure adapted to route signals among the logic blocks, the input/output blocks, and the memory block;
   a configuration port for providing configuration data to the configuration memory cells;
   a bandgap reference circuit adapted to provide a reference voltage;
   a constant current generator adapted to provide a constant current;
   a reference signal circuit adapted to receive the reference voltage and provide a reference signal having a selectable value based on the reference voltage;
   a bipolar diode adapted to receive the constant current and provide a sense signal, wherein a value of the sense signal corresponds approximately to a temperature value of the integrated circuit; and
   a comparator adapted to receive the sense signal and the reference signal and provide a temperature sensor output signal.

2. The integrated circuit of claim 1, wherein the bandgap reference circuit and the constant current generator are contained within a source circuit adapted to provide the constant current and the reference voltage.

3. The integrated circuit of claim 2, wherein the source circuit further comprises a buffer circuit adapted to receive the reference voltage from the bandgap reference circuit and provide the reference voltage to the reference signal circuit, and wherein the reference voltage and the constant current are process and temperature compensated.

4. The integrated circuit of claim 1, wherein the reference signal circuit comprises:
   a resistance ladder adapted to receive the reference voltage and provide a plurality of the selectable values based on the reference voltage; and
   a multiplexer adapted to receive the selectable values and provide the reference signal based on one of the selectable values selectable under control of a multiplexer control signal.

5. The integrated circuit of claim 1, wherein the reference signal circuit comprises:
   a resistance ladder adapted to receive the reference voltage and provide a plurality of the selectable values based on the reference voltage;
   a multiplexer adapted to receive the selectable values and provide the reference signal based on one of the selectable values selectable under control of a multiplexer control signal;
   a decoder adapted to receive a decoder input signal and provide the multiplexer control signal based on the decoder input signal; and
   a multiplexer adapted to receive a plurality of multiplexer input signals and select one of the multiplexer input signals to provide as the decoder input signal.

6. The integrated circuit of claim 5, wherein the multiplexer input signals are provided from within the integrated circuit and/or external to the integrated circuit.

7. The integrated circuit of claim 1, wherein the bipolar diode comprises a bipolar junction transistor having a base terminal coupled to a collector terminal, and wherein a value of the sense signal corresponds to an emitter-base voltage of the bipolar junction transistor.

8. A programmable logic device comprising:
   a plurality of logic blocks;
   a plurality of input/output blocks adapted to provide an input/output interface for the programmable logic device;
   at least one memory block for storing data during operation of the programmable logic device;
   an interconnect structure adapted to route signals among the logic blocks, the input/output blocks, and the memory block;
   a configuration port for providing configuration data to the configuration memory cells;
   means for providing a reference current;
   means for providing a reference voltage;
   means for providing a reference signal having a selectable value based on the reference voltage;
   means for providing a sense signal based on the reference current and a junction temperature of the integrated circuit; and
   means for providing a temperature sensor output signal based on a comparison of the reference signal to the sense signal.

9. The integrated circuit of claim 8, wherein the reference current and the reference voltage are process and temperature compensated.

10. The integrated circuit of claim 8, wherein the temperature sensor output signal is a digital signal indicating if a temperature threshold of the junction temperature has been exceeded.

11. The integrated circuit of claim 8, wherein the integrated circuit is powered down and/or a clock signal is adjusted based on a value of the temperature sensor output signal.

12. The integrated circuit of claim 8, further comprising means for providing a plurality of input control signals to the reference signal providing means.

13. An integrated circuit comprising:
   a bandgap reference circuit adapted to provide a reference voltage;
   a constant current generator adapted to provide a constant current;
   a reference signal circuit adapted to provide a reference signal having a selectable value based on the reference voltage, the reference signal circuit including a resistance ladder adapted to receive the reference voltage and provide a plurality of the selectable values based on the reference voltage;
   a bipolar diode adapted to receive the constant current and provide a sense signal, wherein a value of the sense signal corresponds approximately to a temperature value of the integrated circuit; and
   a comparator adapted to receive the sense signal and the reference signal and provide a temperature sensor output signal.

14. The integrated circuit of claim 13 including a multiplexer adapted to receive the selectable values from the resistance ladder and provide the reference signal based on one of the selectable values selectable under control of a multiplexer control signal.

15. The integrated circuit of claim 14, wherein the multiplexer input signals are provided from within the integrated circuit and/or external to the integrated circuit.

16. The integrated circuit of claim 14 including:
   a decoder adapted to receive a decoder input signal and provide the multiplexer control signal based on the decoder input signal; and
   a multiplexer adapted to receive a plurality of multiplexer input signals and select one of the multiplexer input signals to provide as the decoder input signal.

17. The integrated circuit of claim 13, wherein the bipolar diode comprises a bipolar junction transistor having a base terminal coupled to a collector terminal, and wherein a value of the sense signal corresponds to an emitter-base voltage of the bipolar junction transistor.

18. The integrated circuit of claim 13, wherein the integrated circuit comprises a programmable logic device.

19. The integrated circuit of claim 13, wherein the bandgap reference circuit and the constant current generator are contained within a source circuit adapted to provide the constant current and the reference voltage.

20. The integrated circuit of claim 13, wherein the source circuit further comprises a buffer circuit adapted to receive the reference voltage from the bandgap reference circuit and provide the reference voltage to the reference signal circuit, and wherein the reference voltage and the constant current are process and temperature compensated.

* * * * *